July 5, 1955     HENRI-GEORGES DOLL     2,712,630
METHODS AND APPARATUS FOR ELECTRICAL LOGGING OF WELLS
Filed Nov. 20, 1951     2 Sheets-Sheet 1
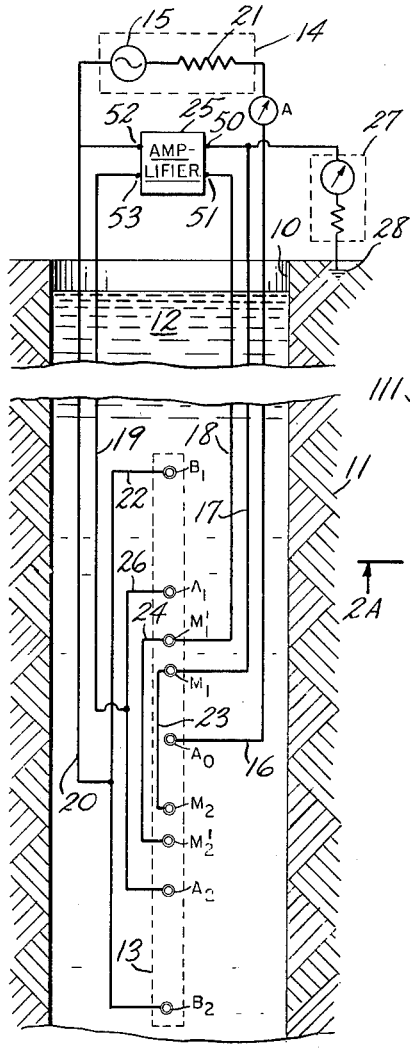
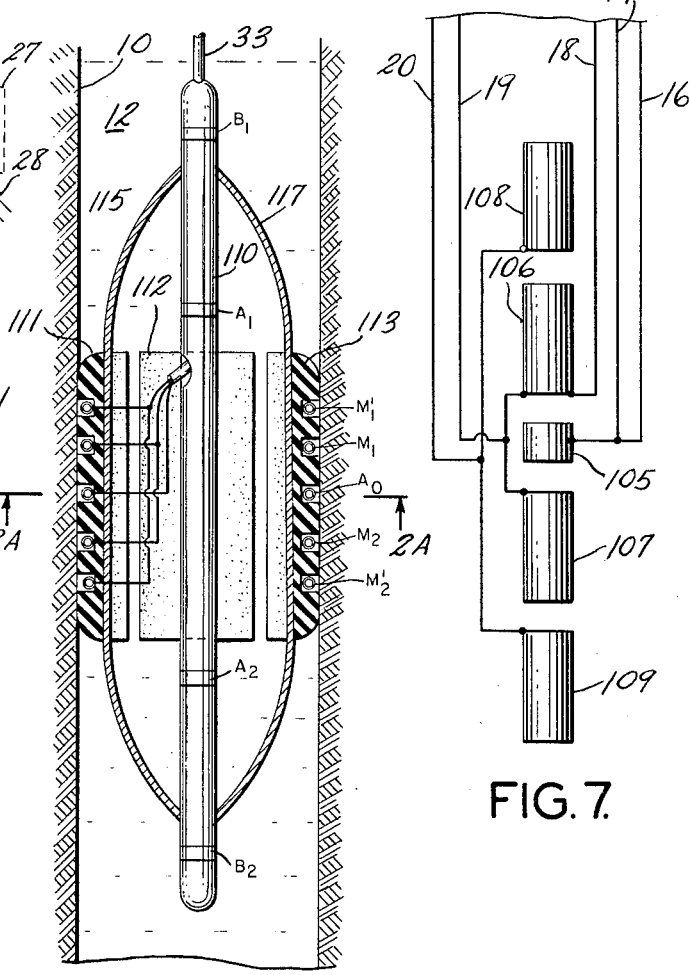
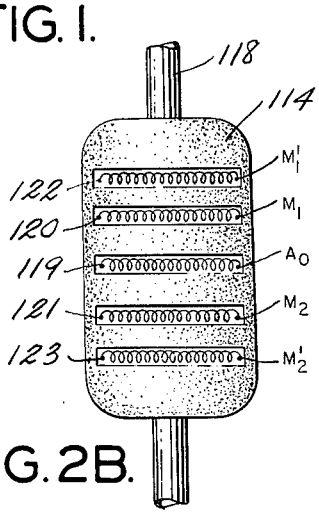
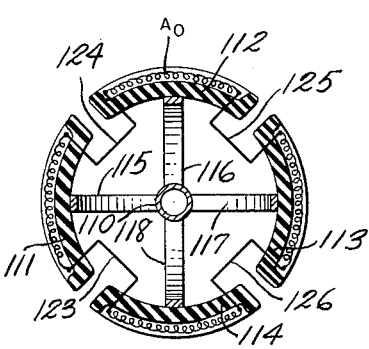
FIG. 1.
FIG. 2.
FIG. 2A.
FIG. 2B.
FIG. 7.
INVENTOR.
HENRI-GEORGES DOLL
BY
his ATTORNEYS.

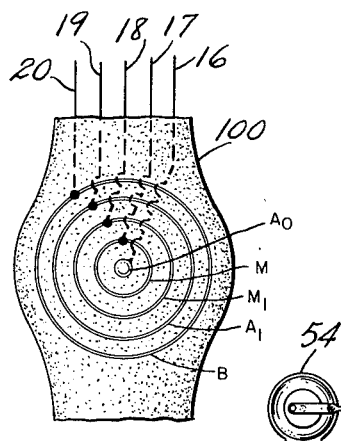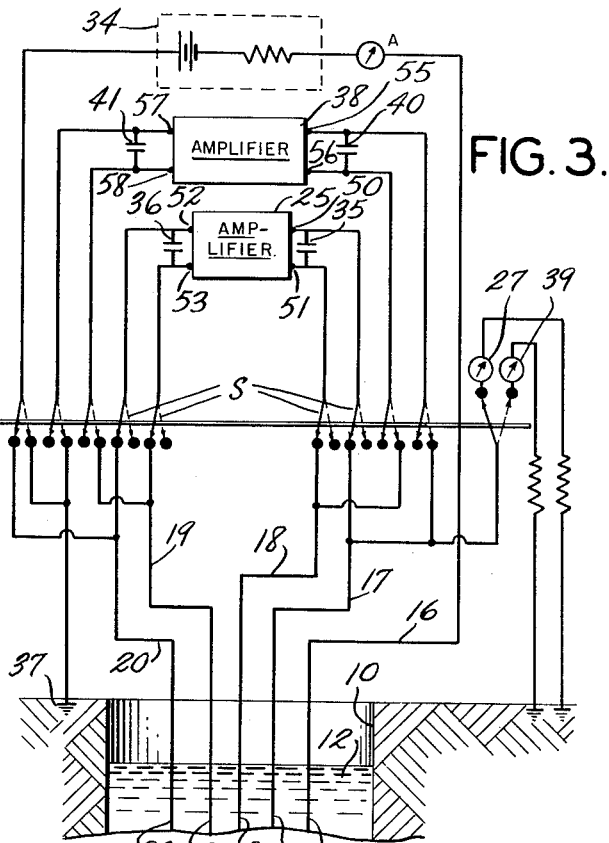

United States Patent Office 2,712,630
Patented July 5, 1955

2,712,630

METHODS AND APPARATUS FOR ELECTRICAL LOGGING OF WELLS

Henri-Georges Doll, Ridgefield, Conn., assignor to Schlumberger Well Surveying Corporation, Houston, Tex., a corporation of Delaware Application November 20, 1951, Serial No. 257,348

13 Claims. (Cl. 324—1)

The present invention relates to electrical logging methods and apparatus and more particularly to novel methods and apparatus for obtaining indications of the electrical resistivities of earth formations traversed by a bore hole in one or more zones located at different lateral depths from the wall of the bore hole.

The applicant's copending applications Serial No. 161,641, filed May 12, 1950, entitled "Electrical Resistivity Well Logging Method and Apparatus," Serial No. 211,788, filed February 19, 1951, entitled "Electrical Logging Apparatus," and Serial No. 214,273, filed March 7, 1951, entitled "Electrical Logging of Earth Formations Traversed by a Bore Hole," disclose a number of different electrical logging systems which utilize controlled electric fields to confine the current emitted by an electrode in a bore hole essentially to a path perpendicular to the wall of the bore hole. In such systems, this perpendicularity of the current path is maintained for a sufficient lateral distance from the wall of the bore hole to insure that the portion of the path traversing the bore hole fluid, mud cake and invaded zone, if any, is relatively short as compared with the portion of the path extending through material at a relatively great distance from the wall of the bore hole. This substantially eliminates the effect of the bore hole fluid, the mud cake, and the material relatively close to the bore hole on the formation resistivity indications that are observed. As a result, logs made by recording variations of a suitably selected potential difference associated with the flow of current through the formations represent the electrical resistivities of materials located at a relatively great lateral distance from the wall of the bore hole.

However, it is also desirable to obtain logs which represent the electrical resistivities of materials relatively close to the wall of the bore hole and from which the effects of the bore hole fluid, the mud cake, and the material at a relatively great distance from the bore hole are substantially eliminated. Such logs would be useful, for example, in obtaining indications which are more accurately representative of the resistivities of zones in permeable formations that have been invaded by filtrate from the bore hole fluid.

It is an object of the present invention, accordingly, to provide new and improved electrical logging methods and apparatus which are capable of producing logs that are more accurately representative of the resistivities of materials in zones relatively close to the wall of a bore hole traversing earth formations.

Another object of the present invention is to provide new and improved electrical logging methods and apparatus from which may be obtained logs that are more accurately representative of the resistivities of zones in permeable formations that have been invaded by bore hole fluid filtrate.

Another object of the invention is to provide new and improved electrical logging methods and apparatus which produce logs of the electrical resistivity of materials surrounding a bore hole drilled into the earth that are substantially unaffected by the bore hole fluid, the mud cake, and the materials lying at a relatively great distance from the wall of the bore hole.

These and other objects of the invention are attained by emitting current in the bore hole from a main power circuit including at least two nearby, longitudinally spaced apart principal current electrodes and utilizing controlled electric fields established in the vicinity of one of the principal electrodes to confine the flow of current from the latter one principal electrode to a path extending therefrom into the wall of the bore hole and generally perpendicular thereto at least through the bore hole fluid and mud cake. The spacing between the principal current electrodes is so selected that the current passing therebetween will not flow to any great lateral depth in the surrounding formations. However, the portion of the current path which passes through the bore hole fluid and the mud cake is still relatively short as compared with the total current path so that these two factors affect the resistivity indications observed only to a slight extent. Accordingly, logs made by recording variations of a suitably selected potential difference associated with said current flow represent more nearly the electrical resistivities of the material close to the wall of the bore hole.

The invention also contemplates the provision of additional means for reducing the influence of the bore hole fluid and the mud cake to a minimum, as will appear hereinafter.

According to another embodiment of the invention, an electrical logging system is provided which includes the novel features outlined above for producing logs of the electrical resistivity of materials relatively close to the wall of the bore hole, in combination with means of the type disclosed in the above mentioned copending applications for producing logs of the electrical resistivity of materials located a relatively great distance from the wall of the bore hole.

The invention will be better understod from the following detailed description of several typical embodiments thereof, taken in conjunction with the accompanying drawings, in which:

Fig. 1 represents schematically an electrical logging system constructed according to the invention in which a plurality of substantially point electrodes are lowered into the bore hole for obtaining indications of the electrical resistivities of material in a zone relatively near the bore hole;

Fig. 2 is a view in longitudinal section of a typical electrode assembly that might be used in the electrical logging system of Fig. 1;

Fig. 2A is a view in transverse section taken along the line 2A—2A of Fig. 2, looking in the direction of the arrows;

Fig. 2B is a view in elevation of one of the wall engaging pads which comprise the electrode assembly shown in Fig. 2;

Fig. 3 is a schematic diagram of the surface equipment for a modification of the electrical logging system shown in Fig. 1 which enables simultaneous indications to be obtained of the electrical resistivities of material in zones relatively near and far, respectively, from the wall of the bore hole;

Fig. 4 is a schematic representation of still another modification which is adapted to provide simultaneous indications of a plurality of electrical resistivity values;

Fig. 5 is a partial view in elevation of another form of electrode assembly which is adapted to minimize the influence of the bore hole liquid on the indications observed;

Fig. 6 is also a partial view in elevation of a further modification of the electrode assembly shown in Fig. 5; and Fig. 7 is a schematic diagram of still another form of electrode assembly employing relatively long electrodes which may be used with the electrical logging systems shown in Figs. 1, 3 and 4.

Fig. 1 shows a bore hole 10, passing through formations 11 and containing a column of relatively conductive drilling fluid 12. Disposed in the bore hole 10 is an electrode array 13 which comprises a plurality of longitudinally disposed, substantially point electrodes having a fixed spacing relative to each other. The electrode array 13 may be passed through the bore hole 10 in any conventional manner as, for example, by the usual electrical cable and winch combination (not shown).

The electrode array 13 includes a plurality of principal current emitting electrodes $A_0$, $B_1$ and $B_2$, the latter two electrodes being symmetrically disposed on opposite sides of the former. Conveniently, the electrodes $B_1$ and $B_2$ may be short-circuited by an insulated conductor 22. The electrode $A_0$ is connected by an insulated conductor 16 to a suitable source of current 14, the other terminal of which is connected by an insulated conductor 20 to the conductor 22. The current source 14 preferably generates a constant current so that the potential measurements made in accordance with the invention may be calibrated directly in units of resistivity, as is well known in the art. To this end, the source 14 may comprise an A. C. generator 15 and a high impedance 21 in series, although D. C. may be employed, if desired.

In the vicinity of the electrode $A_0$ and symmetrically disposed on opposite sides thereof are pairs of electrodes $M_1$, $M_1'$ and $M_2$, $M_2'$, respectively. The electrodes $M_1$ and $M_2$ may for convenience be short-circuited by an insulated conductor 23 and the electrodes $M_1'$ and $M_2'$ by an insulated conductor 24. Current from the source 14 passing between the electrode $A_0$ and the electrodes $B_1$ and $B_2$ will cause a difference of potential to be created in the bore hole fluid 12 between the electrodes $M_1$ and $M_1'$ and between the electrodes $M_2$ and $M_2'$, which potential difference is transmitted by means of the insulated conductors 17 and 18 to the input terminals 50 and 51, respectively, of an amplifying device 25. The output terminal 52 of the amplifying device 25 is connected by an insulated conductor 20 to the electrodes $B_1$ and $B_2$ and the other amplifier terminal 53 is connected by an insulated conductor 19 to a pair of electrodes $A_1$ and $A_2$ disposed, respectively, on opposite sides of the electrode pairs $M_1$, $M_1'$ and $M_2$, $M_2'$. The electrodes $A_1$ and $A_2$ may be short-circuited by an insulated conductor 26, as shown.

The amplifying device 25, which may be a high gain, electronic amplifier or a servo-mechanism, for example, is adapted to supply current of such phase (or polarity) and amplitude to the electrodes $A_1$ and $A_2$ as to maintain the difference in potential between the electrodes $M_1$ and $M_1'$ and between the electrodes $M_2$ and $M_2'$ substantially at zero.

As will be understood by reference to the aforementioned copending application Serial No. 161,641, by maintaining substantially zero the potential differences between the electrodes $M_1$ and $M_1'$ and between the electrodes $M_2$ and $M_2'$, the bore hole is effectively electrically plugged at these locations whereby current from the principal electrode $A_0$ is forced to pass into the formation in a radial direction substantially perpendicularly to the axis of the bore hole 10.

However, in accordance with the present invention, the spacing between the principal current electrode $A_0$ and each of the principal current electrodes $B_1$ and $B_2$ is made sufficiently small to insure that the current will not penetrate to any great distance into the formations 11. The actual depth of penetration may be preselected by proper adjustment of the electrode spacings. In general, however, the spacing between the principal current electrode $A_0$ and each of the principal current electrodes $B_1$ and $B_2$ will be less than the value at which the electrodes $B_1$ and $B_2$ can be considered to be at electrical infinity with respect to the potential pickup position near the electrode $A_0$. In this respect, electrical logging systems according to the invention differ markedly from prior art systems, in which the spacing between the current electrodes is always made sufficient to insure that at least one of them can be considered to be at electrical infinity with respect to the potential pickup position near the other.

In one practical field embodiment, the electrode spacings were as follows: from the center of the electrode $A_0$ to the mid-point between the electrodes $M_1$ and $M_1'$, 9 inches; between centers of the electrodes $M_1$ and $M_1'$, 5 inches; between centers of the electrodes $A_0$ and $A_1$, 16 inches; and between centers of the electrodes $A_0$ and $B_1$, 40 inches. The electrodes $M_2$, $M_2'$, $A_2$ and $B_2$ were symmetrically placed on the opposite side of the electrode $A_0$. With such spacings, and in the range of the bore hole and formation resistivities usually encountered in practice, the current passing between the electrodes $A_0$ and the electrodes $B_1$, $B_2$ will not penetrate the surrounding formations appreciably further than a distance equal to 5 times the diameter of the bore hole 10.

In accordance with the invention, potential measurements are made between a point at ground potential and a point in the vicinity of a location in the bore hole where substantially zero potential difference is being maintained. For example, in Fig. 1 a high impedance potential measuring device 27 is connected between the electrode $M_1$, $M_2$ and ground 28. Preferably, the measuring device 27 is calibrated in units of resistivity and makes a continuous resistivity log correlated with the depth of the electrode array 13 in the bore hole 10. Accordingly, as the electrode array 13 is moved through the bore hole 10, continuous indications are obtained of the electrical resistivities of materials lying within a short lateral distance from the bore hole 10. These indications will be substantially unaffected by the bore hole fluid and by the presence of mud cake on the wall of the bore hole. Hence, in the case of permeable formations invaded by the bore hole fluid, the indications obtained will be more accurately representative of the resistivities of such invaded zones. Further, for the specific electrode spacings given above by way of example, if a zone is invaded to an extent equal to or greater than 5 times the bore hole diameter, substantially the actual resistivity of such invaded zone will be indicated.

The effect of the bore hole fluid on the indications obtained may be even further reduced by maintaining the electrodes $A_0$, $M_1$, $M_2$, $M_1'$ and $M_2'$ in close proximity to the wall of the bore hole and substantially isolated from direct contact with the fluid during the logging operation, as shown in Figs. 2, 2A and 2B.

In Fig. 2 is shown a nonconductive support 110 which is adapted to be passed through the bore hole 10 by means of an electrical cable 33 containing the conductors 16, 17, 18, 19 and 20 (Fig. 1). The electrodes $A_1$, $A_2$, $B_1$ and $B_2$ are mounted on the support 110 in the same manner and with substantially the same spacings as shown in Fig. 1, although the spacings may be reduced, if desired, in which case the current penetration will also be reduced. However, the electrodes $A_0$, $M_1$, $M_2$, $M_1'$ and $M_2'$ are circular in shape and are maintained in electrical contact with the wall of the bore hole 10 but are isolated from direct contact with the bore hole fluid 12.

In order that the electrodes may conform to variations in the diameter of the bore hole 10, each electrode may be divided into a plurality of arcuate sections, each section being mounted on a mechanically separate, electrically insulating pad. Thus, for example, four pads 111, 112, 113 and 114 (Fig. 2A) made of flexible, electrically insulating material such as rubber, for example, may be separately pressed against the wall of the bore hole 10 by means of springs 115, 116, 117 and 118 carried by the support 110.

As shown in Fig. 2B, each of the pads 111, 112, 113 and 114 may have a smooth wall engaging surface into which may be machined or molded, for example, a plurality of grooves 119, 120, 121, 122 and 123 running in a plane perpendicular to the axis of the bore hole 10. In the groove 119 is disposed an arcuate section of the electrode $A_0$, the remaining grooves 120, 121, 122 and 123 containing arcuate sections of the electrodes $M_1$, $M_2$, $M_1'$ and $M_2'$, respectively. Preferably, the electrode sections are recessed in the grooves 119–123, inclusive, as shown, in order to prevent rubbing of the electrodes against the wall of the bore hole. These electrode sections may be manufactured from helically coiled Nichrome wire; for example, so that they can bend with the pads 111, 112; 113 and 114 and so as to provide a large exposed electrical surface. As shown in Fig. 2A, the several arcuate sections forming a particular electrode ($A_0$ in Fig. 2A) are connected in series by the insulated conductors 123—126, inclusive, so that each electrode is substantially circular in shape.

In operation, as the support 110 is moved through the bore hole 10 by means of electrical cable 33, the surfaces of the pads 111–114, inclusive, will conform to the wall of the bore hole and the electrodes $A_0$, $M_1$, $M_2$, and $M_1'$, and $M_2'$ will be in electrical contact with the bore hole wall but insulated from direct electrical contact with the bore hole fluid. Accordingly, indications will be obtained of the resistivities of materials in the vicinity of the bore hole 10. Since for all practical purposes the electrodes $A_0$, $M_1$, $M_2$, $M_1'$, $M_2'$ are in electrical communication only with the wall of the bore hole, these indications will be unaffected by the resistivity of the fluid in the bore hole. It should be noted, however, that electrical communication between these electrodes and the bore hole liquid need not be completely blocked off since the current from the electrode $A_0$ is highly directional in its effect.

In Fig. 3 is shown one form of surface equipment which may be used with the electrode arrays illustrated in Figs. 1 and 2 for obtaining, simultaneously, indications of the electrical resistivity of the material in a zone close to the wall of the bore hole and indications of the electrical resistivity of material in a zone located at a relatively great distance from the wall of the bore hole. In this figure, the conductors 16, 17, 18, 19 and 20 may be connected to an electrode array of the type shown in Figs. 1 and 2 in substantially the same manner as shown in Fig. 1. However, in series with each of the conductors 16–20, inclusive, is an electrical switch S which is adapted to be continuously switched between two positions at a relatively low frequency, say 15 cycles per second, by suitable means such as an electric motor 54, for example. Also, the constant current source is shown as being a D. C. source.

With the switches S in the solid-line positions shown in Fig. 3, the electrode array is connected in the same manner as shown in Fig. 1, similar reference numerals indicating similar electrical apparatus. Accordingly, the meter 27 will give indications of the electrical resistivities of the material in zones close to the wall of the bore hole 10, as described in detail above.

When the switches S are in the position indicated by the dotted lines in Fig. 3, however, the input terminals 50 and 51 of the amplifying device 25 are disconnected from the conductors 17 and 18, respectively, while the amplifier output terminals 52 and 53 are disconnected from the conductors 20 and 19, respectively. In order to prevent any substantial voltage change in the input and output circuits of the amplifying device 25 during the period while these circuits are open, capacitors 35 and 36 may be placed across the input and output circuits, respectively, as shown. This insures that the amplifying device 25 will be ready to resume its degenerative operation almost instantaneously when it is switched back into the electrode array circuit.

Also, while the switches S are in the dotted line position, one terminal of the constant current source 34 is disconnected from the conductor 20 and is connected to the ground 37 at the surface of the earth. Further, the conductors 17 and 18, which receive the potential difference existing between the electrodes $M_1$ and $M_1'$ (Fig. 1), and between the electrodes $M_2$ and $M_2'$, are now connected to the input terminals 55 and 56, respectively, of an amplifying device 38 which may be similar to the amplifying device 25, if desired. The output terminals 57 and 58 of the amplifying device 38 are connected, respectively, to the ground 37 and to the conductor 19 which leads to the electrodes $A_1$ and $A_2$.

Movement of the switches S to the dotted line positions also connects the conductor 17 to one terminal of a high impedance meter 39, the other terminal of which is grounded at the surface, as shown. As will be understood from the aforementioned copending application Serial No. 161,641, the meter 39 will give indications of the electrical resistivities of material in zones located at relatively great distances from the wall of the bore hole 12. When the switches S are returned to their original positions, both the input and the output terminals of the amplifying device 38 are disconnected from the respective conductors. Accordingly, capacitors 40 and 41 may be provided across the input and output terminals, respectively, to maintain the input and output voltages of the amplifying device 38 substantially constant while the amplifying device 38 is cut out of the system. When the switches S are back in their former position, meter 27 will again give indications of the resistivities of material in the vicinity of the bore hole 10.

In operation of the embodiment shown in Fig. 3, the switches S are continuously alternated between their two positions as the electrode array is moved through the bore hole. When the switches are in the solid-line positions, the meter 27 provides indications of the electrical resistivity of the material in zones close to the wall of the bore hole, and when the switches S are in the dotted-line positions, the meter 39 will give indications of the electrical resistivity of material in zones located a relatively great distance from the wall of the well.

The meters 27 and 39 should preferably have sufficient inertia to give substantially continuous indications, regardless of the momentary interruptions by the switches S. Alternatively, conventional means might be provided for filtering out the A. C. components in the inputs to the meters 27 and 39. The meters 27 and 39 are preferably designed to give a record of resistivities as a function of the depth of the electrode array in the bore hole.

Simultaneous resistivity indications of the type afforded by the apparatus of Fig. 3 may also be obtained with the modification shown in Fig. 4. In this figure, the electrode array (not shown) may be the same as either one of the forms shown in Figs. 1 and 2, having electrical conductors 16, 17, 18, 19 and 20 extending to the surface of the earth. In this embodiment, however, an A. C. source 42 of constant current intensity and of frequency $f_1$ is connected to the electrode $A_0$ by the conductor 16 and to the electrodes $B_1$ and $B_2$ (Figs. 1 or 2) by the conductor 20. Also, a second A. C. source of constant current intensity and frequency $f_2$ is connected to the ground 37 and to the principal current electrode $A_0$ by the conductor 16.

The conductors 17 and 18, which receive potential differences of frequencies $f_1$ and $f_2$ from the electrodes $M_1$ and $M_1'$ are connected to the input terminals of the amplifiers 44 and 47 through the filters 45 and 48, respectively, which are designed to pass only currents of frequencies $f_1$ and $f_2$, respectively. The output of the amplifier 44, which is a current of frequency $f_1$, is supplied to the electrodes $B_1$ and $B_2$ by the conductor 20 and to the electrodes $A_1$ and $A_2$ by the conductor 19. Similarly, the output of the amplifier 47, which is a current of frequency $f_2$, is fed to the electrodes $A_1$ and $A_2$ by the conductor 19 and to the ground 37 at the surface of the earth.

Indications of electrical resistivity are provided by a high impedance meter 27 connected to ground and to the conductor 17 through a filter 46 designed to pass only current of frequency $f_1$, and by another high impedance meter 39 connected to ground and to the conductor 17 through a filter 49 designed to pass only current of frequency $f_2$.

It will be recognized that the portion of the system including the source 42, the amplifier 44 and its filter 45, the meter 27 and its filter 46, and the electrodes connected thereto constitutes an electrical logging system of the type shown in Fig. 1, and that the meter 27 will provide indications of the electrical resistivity of material in zones close to the wall of the bore hole. On the other hand, the portion of the system which includes the source 43, the amplifier 47 and its filter 48, the meter 39 and its filter 49 and the electrodes connected thereto constitutes an electrical logging system of the type shown in the aforementioned copending application Serial No. 161,641 so that the meter 39 affords simultaneous indications of the electrical resistivity of material in zones located a considerable distance from the wall of the bore hole.

The indications obtained with electrical logging systems comprising either of the forms of measuring apparatus shown in Figs. 3 and 4 in conjunction with either of the electrode arrays shown in Figs. 1 or 2 are doubly useful. First, they enable the resistivity values described above to be obtained. Secondly, by recording the two indications on the same graph, it is possible to determine readily the location of permeable formations. Thus, opposite impermeable formations, the indications observed will be substantially identical since the materials measured by the meters 27 and 39 will have substantially the same electrical resistivities, there being no invaded zones. However, opposite permeable formations wherein there will be invaded zones having a substantially different resistivity than the non-invaded portions, the two meters 27 and 39 will give substantially different indications since each investigates to a different depth. In this fashion, the boundaries of permeable formations can be accurately determined.

In Figs. 5, 6 and 7 are shown additional modifications of electrode arrays which may be employed in connection with the electrical circuits shown in Figs. 1, 3 and 4. In Fig. 5, a principal current electrode $A_0$ and a plurality of concentric electrodes M, $M_1$, and $A_1$ are inserted in the face of a pad 100 which may be constructed and pressed continuously against the wall of the bore hole in substantially the same manner as shown and explained in the aforementioned copending application Serial No. 214,273. However, it includes an additional concentric current electrode B which is placed in the pad 100 outside of the other electrodes.

When the electrodes in the pad 100 are connected to the circuit shown in Fig. 1 and the pad 100 is passed along the wall of the bore hole, it will be understood that current from the principal electrode $A_0$ will pass laterally into the formations through any mud cake that may be present. However, in accordance with the invention, the current from the electrode $A_0$ passes only a short distance into the formations due to the proximity of the other principal current electrode B. Accordingly, measurements made at the meter 27 (Fig. 1) using the array shown in Fig. 5 will give indications of the resistivities of material very close to the wall of the bore hole. Such an arrangement is valuable for obtaining indications of the resistivities of very shallow invaded zones.

It should be noted that the electrode B, in Fig. 5, need not be embedded in a pad 100, but could, for example, be a metallic ring about the pad.

In Fig. 6 is shown an electrode array from which can be obtained results similar to those produced with the electrode array shown in Fig. 5, when connected to the electrical circuit shown in Fig. 1. In Fig. 6, however, the pad 101 contains a reduced number of electrodes which preferably are of larger surface area. The center electrode 102 combines the functions of the electrodes $A_0$ and M shown in Fig. 5; the electrode 103, the functions of the electrodes M' and $A_1$; and the electrode 104, the function of the electrode B. A similar electrode array, but intended for greater depths of investigation is shown in the aforementioned copending application Serial No. 214,273.

In the electrode array of Fig. 7 there are a plurality of cylindrical electrodes 105, 106, 107, 108 and 109 vertically disposed along the axis of the bore hole, which may be similar in construction to those shown in the copending application Serial No. 211,788. An electrode array of this type may be connected to the electrical circuit shown in Fig. 1. Thus, the center electrode 105 is connected to the conductors 16 and 17. The electrodes 106 and 107 are short-circuited and connected to the conductors 18 and 19. The electrodes 108 and 109 are short-circuited and connected to the conductor 20. As will be understood by reference to the copending application Serial No. 211,788, current emitted from the electrode 105 will penetrate the formations in a direction substantially perpendicular to the axis of the bore hole. However, due to the proximity of the current return electrodes 108 and 109, the current will not penetrate the wall of the bore hole to any great depth. Hence, measurements made by the circuit arrangement shown in Fig. 1 connected to the array shown in Fig. 5 will be similar to those obtained with the electrode array shown in Fig. 1.

It will be understood that the electrode arrays shown in Figs. 5, 6, and 7 may be used to obtain simultaneous resistivity measurements at two depths of investigation by employing, for example, the electrical circuits shown in Figs. 3 and 4.

It will also be understood that spontaneous potential measurements may also be obtained, as for example by measuring the D. C. potential at the electrode $M_1$ with respect to ground simultaneously with the A. C. resistivity measurements obtained with the electrical connections shown in Figs. 1 and 4.

From the foregoing, it will be apparent that the invention provides novel and highly effective electrical logging methods and apparatus which enable the electrical resistivities of materials in one or more zones at different lateral depths from the wall of the bore hole to be determined with greater accuracy than has been possible heretofore.

The several illustrative embodiments described above are obviously susceptible of modification in form and detail within the spirit of the invention. For example, in Fig. 3, the output of the amplifying device 38 may be connected between the ground 37 and the electrodes $B_1$ and $B_2$, or between the ground 37 and the electrodes $A_1$, $A_2$, $B_1$ and $B_2$ instead of the connections shown. Also, it will be understood that the specific apparatus disclosed herein for maintaining the electrodes in electrical contact with the bore hole is intended to be merely illustrative, and other means suitable for this purpose will be readily apparent to those skilled in the art. These and other modifications are intended to be included within the scope of the following claims.

I claim:

1. In a method of investigating earth formations traversed by a bore hole containing a column of conductive liquid, in a zone close to the wall of the bore hole, the steps of passing electric current through the surrounding formations between a pair of locations spaced a short distance apart in the bore hole, establishing an electric field in the vicinity of one of said locations of such magnitude and polarity as to cause the current flow in the vicinity of said one location to follow a path substantially perpendicular to the wall of the bore hole at least through the bore hole liquid and through any mud cake formed on the wall of the bore hole, and obtaining indications of potential difference between a reference datum substantially at ground potential and a place in the bore hole between said locations where the potential gradient attributable to the combined effect of said current and said electric field is substantially zero, the spacings between said locations and said place being such that neither of said locations can be considered to be at electrical infinity with respect to said place.

2. In a method of investigating earth formations traversed by a bore hole containing a column of conductive liquid, in a zone close to the wall of the bore hole, the steps of passing electric current through the surrounding formations between a first location located in the bore hole and two other nearby locations disposed symmetrically on opposite sides of said first location, establishing in the bore hole immediately above and below said first location electric fields of such magnitude and polarity as to cause the current flow in the vicinity of said first location to follow a path substantially perpendicular to the wall of the bore hole at least through the bore hole liquid and through any mud cake formed on the wall of the bore hole, and obtaining indications of potential difference between a reference datum substantially at ground potential and a place in the bore hole between said first location and at least one of said two other locations where the potential gradient attributable to the combined effect of said current and at least one of said electric fields is substantially zero, the spacings between said first location, said place and each of said two other locations being such that none of said locations can be considered as being at electrical infinity with respect to said place.

3. In a method of investigating earth formations traversed by a bore hole containing a column of conductive liquid, the steps of passing periodically varying D. C. through the surrounding formations between a pair of longitudinally spaced apart locations in the bore hole, the establishing in the vicinity of one of said locations a periodically varying D. C. electric field of such magnitude and phase as to cause the flow of said current to follow a path substantially perpendicular to the wall of the bore hole at least through the bore hole liquid and through any mud cake formed on the wall of the bore hole, and obtaining indications of potential difference between a reference datum substantially at ground potential and a place in the bore hole between said locations where the potential gradient attributable to the combined effect of said current and said electric field is substantially zero, the spacings between said locations and said place being such that neither of said locations can be considered to be at electrical infinity with respect to said place.

4. In a method of investigating earth formations traversed by a bore hole containing a column of conductive liquid, the steps of passing periodically varying current through the surrounding formations between a first location in the bore hole and second and third locations longitudinally spaced apart from, and symmetrically disposed on opposite sides of said first location, establishing in the bore hole immediately above and below said first location periodically varying electric fields of such magnitude and phase as to cause current flowing between said first and second and third locations to follow a path substantially perpendicular to the wall of the bore hole in the vicinity of said first location, at least through the bore hole liquid and through any mud cake formed on the wall of the bore hole, and obtaining indications of potential difference between a reference datum substantially at ground potential and at least one place in the bore hole between said first location and one of said second and third locations where the potential gradient attributable to the combined effect of said current and said electric fields is substantially zero, the spacings between said locations and place being such that none of said locations can be considered to be at electrical infinity with respect to said place.

5. In a method of investigating earth formations traversed by a bore hole containing a column of conductive liquid, the steps of passing alternating current of given frequency and substantially constant magnitude through the surrounding formations between a first location and second and third locations disposed symmetrically on opposite sides of said first location, establishing in the bore hole immediately above and below said first location alternating electric fields of a said given frequency and of such magnitude and phase as to cause current of said given frequency flowing in the vicinity of said first location to follow a path substantially perpendicular to the wall of the bore hole at least through the bore hole liquid and through any mud cake formed on the wall of the bore hole, and obtaining indications of potential difference of said given frequency between a reference datum substantially at ground potential and a place in the bore hole between said first location and at least one of said second and third locations where the potential gradient attributable to the combined effect of said current of given frequency and of said electric fields of given frequency is substantially zero, the spacings between said locations and said place being such that none of said locations can be considered to be at electrical infinity with respect to said place.

6. In apparatus for investigating earth formations traversed by a bore hole containing a column of conducting liquid, the combination of at least two principal current electrodes mounted for movement through the bore hole in spaced apart relation, a source of electrical energy connected to said electrodes for passing current through the surrounding formations, electrically energized means for establishing in the vicinity of one of said electrodes an electric field of such magnitude and polarity as to cause that portion of said current flowing in the vicinity of said one electrode to follow a path substantially perpendicular to the wall of the bore hole at least through the bore hole fluid and through any mud cake formed on the wall of the bore hole, a third electrode mounted in fixed relation between said current electrodes in a region where the potential gradient attributable to the combined effect of said current and said electric field is substantially zero, and electrical indicating means connected to said third electrode and to a reference datum substantially at ground potential, the spacings between said electrodes being such that neither of said two electrodes can be considered to be at electrical infinity with respect to said third electrode.

7. In apparatus for investigating earth formations traversed by a bore hole containing a column of conductive fluid, the combination of a first current emitting electrode mounted for movement through the bore hole, second and third short-circuited current electrodes disposed symmetrically above and below said first current electrode and in fixed relation thereto, means including said second and third current electrodes and responsive to the potential gradient at at least one location near said first electrode for establishing in the bore hole immediately above and below said first electrode electric fields of such magnitudes and polarities as to cause that portion of said current flowing in the vicinity of said first electrode to follow a path substantially perpendicular to the wall of the bore hole, at least through the bore hole liquid and through any mud cake formed on the wall of the bore hole, and indicating means connected to respond to potential difference between a reference datum substantially at ground potential and a place in the bore hole between said first electrode and at least one of said second and third electrodes where the potential gradient attributable to the combined effect of said current and said electric fields is substantially zero, the spacings between said electrodes and place being such that none of said electrodes can be considered to be at electrical infinity with respect to said place.

8. In apparatus for investigating earth formations traversed by a bore hole containing a column of conductive liquid, the combination of an electrode array adapted to be moved through the bore hole and comprising a central electrode, a first pair of electrodes disposed symmetrically on opposite sides of said central electrode and a second pair of electrodes disposed symmetrically on opposite sides of said central electrode outside of said first pair, a short-circuiting connection between the electrodes of said first pair, a short-circuiting connection between the electrodes of said second pair, insulating means blocking off direct electrical communication between said central electrode and said first and second pairs of electrodes and the bore hole liquid while permitting electrical communication between all of said electrodes and the wall of the bore hole, a third pair of electrodes disposed symmetrically on opposite sides of said central electrode outside of said two pairs of electrodes, a fourth pair of electrodes disposed symmetrically on opposite sides of said central electrode outside of said third pair of electrodes, a source of electrical energy having one terminal connected to said central electrode and another terminal connected to the electrodes of said fourth pair for passing current through the surrounding formations, electrical means responsive to the potential difference between adjacent electrodes of said first and second pairs for supplying to the electrodes of said third pair current of such magnitude and polarity as to reduce said potential difference substantially to zero, and electrical indicating means connected to respond to potential difference between a reference datum substantially at ground potential and a place in the bore hole between said central electrode and at least one of the electrodes of said fourth pair where the potential gradient attributable to said two currents is substantially zero, the spacings between said electrodes and place being such that said central electrode and the electrodes in said fourth pair cannot be considered to be an electrical infinity with respect to said place.

9. In apparatus for investigating earth formations traversed by a bore hole containing a column of conducting liquid, the combination of an electrode array adapted to be moved through the bore hole and comprising a central current electrode and at least three essentially circular electrodes of different radii disposed concentrically about said central electrode, means for blocking direct electrical communication between said electrodes and the main body of the bore hole liquid while permitting electrical communication between said electrodes and the wall of the bore hole, a circular outer current electrode mounted concentrically about said central current electrode, a source of electrical energy having one terminal connected to said central current electrode and another terminal connected to said outer current electrode, electrical means responsive to the potential difference between the innermost two of said three concentric electrodes for supplying to the third concentric electrode and to said outer current electrode electric current of such magnitude and polarity as to reduce said potential difference substantially to zero, and electrical indicating means connected to respond to potential difference between a reference datum substantially at ground potential and a place in the bore hole between said central current electrode and said outer current electrode where the potential gradient attributable to the combined effect of said currents is substantially zero, the radial distances between said electrodes and place relatively to said central electrode being such that said outer electrode and said central electrode cannot be considered to be at electrical infinity with respect to said place.

10. In apparatus for investigating earth formations traversed by a bore hole containing a column of conductive liquid, the combination of an electrode array adapted to be lowered into a bore hole and comprising a central current electrode of relatively large surface area, and at least two essentially circular electrodes of different radii disposed concentrically about said central current electrode, means for blocking direct electrical communication between said electrodes and the main body of the bore hole liquid while permitting electrical communication between said electrodes and the wall of the bore hole, a source of electrical energy having one terminal connected to said central electrode and another terminal connected to the outermost concentric electrode for passing current through the surrounding formations, electrical means responsive to the potential difference between said central current electrode and the adjacent concentric electrode for supplying to the two outermost concentric electrodes electric current of such magnitude and polarity as to reduce said potential difference substantially to zero, and electrical indicating means connected to said central electrode and to ground.

11. In apparatus for investigating earth formations traversed by a bore hole containing a column of conducting liquid, the combination of an electrode array adapted to be lowered into a bore hole and comprising a central electrode, a first pair of electrodes disposed symmetrically on opposite sides of said central electrode and a second pair of electrodes disposed symmetrically on opposite sides of said central electrode outside of said first pair, the spacing between said central electrode and each of the electrodes of said second pair being such that neither of the electrodes of said second pair can be regarded as being at electrical infinity with respect to said central electrode, a source of current having one terminal connected to said central electrode and another terminal connected to the electrodes of said second pair, electrical means responsive to the potential difference between said central electrode and the electrodes of said first pair for supplying to the electrodes of said first pair and to the electrodes of said second pair current of such magnitude and polarity as to reduce said potential difference substantially to zero, and electrical indicating means connected to said central electrode and to ground.

12. In apparatus for investigating earth formations traversed by a bore hole containing a column of conductive fluid, the combination of an electrode array adapted to be moved through a bore hole and comprising a central current electrode, a first pair of electrodes disposed symmetrically about said central electrode, a second pair of electrodes disposed symmetrically about said central electrode outside of said first pair, a third pair of electrodes disposed symmetrically about said central electrode outside of said second pair and a fourth pair of electrodes symmetrically disposed about said central electrode outside of said third pair, short-circuiting electrical connections between the electrodes of said respective pairs, a source of electrical energy having one terminal connected to said central electrode and having another terminal, periodically actuated first switching means for connecting said another terminal of the source alternately to said fourth pair of electrodes and to ground, first amplifier means having input terminals and output terminals, second switching means operated in synchronism with said first switching means for connecting the input terminals of said first amplifier means intermittently to said first and second pairs of electrodes and for connecting the output terminals of said first amplifier means intermittently to said third and fourth pairs of electrodes, second amplifier means having input terminals and output terminals, third switching means operated in synchronism with said first and second switching means for connecting the input terminals of said second amplifier means intermittently to said first and second pairs of electrodes and for connecting the output terminals of said second amplifier means intermittently to said third pair of electrodes and to ground, first indicating means having a grounded terminal and another terminal, second indicating means having a grounded terminal and another terminal and fourth switching means operated in synchronism with said first switching means for connecting the other terminals of said indicating means alternately to a place in the bore hole between said central electrode and at least one of the electrodes of said fourth pair where the potential gradient attributable to combined effect of the current from said source and from either of said amplifier means is substantially zero, the spacings between said place, said central electrode and each of the electrodes of said fourth pair being such that none of said last-named electrodes can be considered to be at electrical infinity with respect to said place.

13. In apparatus for investigating earth formations traversed by a bore hole containing a column of conductive fluid, the combination of an electrode array adapted to be moved through a bore hole and comprising a central current electrode, a first pair of electrodes disposed symmetrically about said central electrode, a second pair of electrodes disposed symmetrically about said central electrode outside of said first pair, a third pair of electrodes disposed symmetrically about said central electrode outside of said second pair and a fourth pair of electrodes symmetrically disposed about said central electrode outside of said third pair, short-circuiting electrical connections between the electrodes of said respective pairs, the spacing between said central electrode and each of the electrodes of said fourth pair being such that neither of said last-named electrodes can be considered to be at electrical infinity with respect to said central electrode, a source of alternating current of first frequency having one terminal connected to said central electrode and another terminal connected to said fourth pair of electrodes, a source of alternating current of second frequency having one terminal connected to said central electrode and another terminal connected to ground, first amplifier means responsive to potential differences of said first frequency between said first and second pairs of electrodes for supplying to said third and fourth pairs of electrodes alternating current of said first frequency and of such magnitude and phase as to reduce said potential differences substantially to zero, second amplifier means responsive to potential differences of said second frequency between said first and second pairs of electrodes for supplying to said third pair of electrodes and to ground alternating current of said second frequency and of such magnitude and phase as to reduce substantially to zero said potential differences of second frequency, first indicating means connected so as to be responsive to alternating potential difference of said first frequency between ground and a place in the bore hole where the potential gradient attributable to the combined effect of said currents of first frequency is substantially zero, and second indicating means connected to respond to potential difference of said second frequency between ground and a location in the bore hole between said central electrode and at least one of the electrodes of said fourth pair where the potential gradient attributable to the combined effect of said currents of second frequency is substantially zero, the spacings between said place, said central electrode and each of the electrodes of said fourth pair being such that none of said last-named electrodes can be considered to be at electrical infinity with respect to said place.

References Cited in the file of this patent
UNITED STATES PATENTS

| | | |
|---|---|---|
| 2,398,761 | Aiken | Apr. 23, 1946 |
| 2,501,953 | Martin | Mar. 28, 1950 |
| 2,592,125 | Doll | Apr. 8, 1952 |

OTHER REFERENCES

"Geophysical Exploration," by Heiland, 1940, pages 707, 708, published by Prentice-Hall, Inc., 70 Fifth Ave., New York, New York.